United States Patent [19]

Sakakibara

[11] 4,291,596
[45] Sep. 29, 1981

[54] FLOW REGULATOR VALVE IN HYDRAULIC CONTROL SYSTEM FOR AUTOMATIC TRANSMISSION

[75] Inventor: Shiro Sakakibara, Toyokawa, Japan

[73] Assignee: Aisin-Warner Kabushiki Kaisha, Anjo, Japan

[21] Appl. No.: 1,273

[22] Filed: Jan. 5, 1979

[30] Foreign Application Priority Data

Jan. 10, 1978 [JP] Japan .................. 53-1375

[51] Int. Cl.³ .................. B60K 41/06; B60K 41/10
[52] U.S. Cl. .................. 74/867; 74/861; 74/868; 74/869
[58] Field of Search .......... 74/867, 868, 869, 752 C, 74/861

[56] References Cited

U.S. PATENT DOCUMENTS

| | | | |
|---|---|---|---|
| 2,893,261 | 7/1959 | Flinn | 74/472 |
| 2,931,251 | 4/1960 | Wayman | 74/752 C X |
| 3,056,313 | 10/1962 | Lindsay | 74/752 C |
| 3,117,464 | 1/1964 | Ivey | 74/472 |
| 3,165,946 | 1/1965 | Wayman | 74/645 |
| 3,167,970 | 2/1965 | Wagner et al. | 74/868 X |
| 3,398,607 | 8/1968 | Chana | 74/868 X |
| 3,631,950 | 1/1972 | Tanaka | 74/752 C X |
| 3,651,714 | 3/1972 | Ohya et al. | 74/867 |
| 3,800,629 | 4/1974 | Lentz | 74/869 |
| 3,949,627 | 4/1976 | Murakami | 74/867 |
| 4,046,033 | 9/1977 | Hashimoto et al. | 74/869 |
| 4,129,051 | 12/1978 | Shindo | 74/867 |

*Primary Examiner*—Leslie Braun
*Attorney, Agent, or Firm*—Oblon, Fisher, Spivak, McClelland & Maier

[57] ABSTRACT

In an hydraulic control system for an automatic transmission of a vehicle, when a low range frictional engagement mechanism is engaged in response to shift-down operation of the transmission, a flow regulator valve serves to steplessly regulate flow of fluid from a source of line pressure to the low range frictional engagement mechanism in accordance with changes of travel speed of the vehicle.

4 Claims, 5 Drawing Figures

4,291,596

FLOW REGULATOR VALVE IN HYDRAULIC CONTROL SYSTEM FOR AUTOMATIC TRANSMISSION

BACKGROUND OF THE INVENTION

The present invention relates to an hydraulic control system for an automatic transmission of a vehicle, and more particularly relates to a flow regulator valve disposed within the hydraulic control system for regulating the flow of fluid supplied from a source of line pressure to a servomotor of a frictional engagement mechanism of the transmission.

To prevent undesired shocks and various noises in shift-down operation of the transmission, it is required that the low range frictional engagement mechanism is gradually engaged in relation to disengagement of the high range frictional engagement mechanism.

SUMMARY OF THE INVENTION

It is, therefore, a primary object of the present invention to provide an hydraulic control system wherein when the low range frictional engagement mechanism is engaged in response to shift-down operation of the automatic transmission, a flow regulator valve serves to steplessly regulate the flow of fluid from the pressure source to the low range frictional engagement mechanism in accordance with changes of travel speed of the vehicle.

According to the present invention, there is provided a hydraulic control system for an automatic transmission having an input shaft adapted to be driven by an engine, an output shaft adapted to drive the vehicle, a change-speed gearing including low and high range frictional engagement mechanisms for respectively completing low and high speed ratio power trains between the input and output shafts, the hydraulic control system comprising a fluid reservoir, a source of line pressure, a first fluid passage in communication with the pressure source, a second fluid passage in communication with the low range frictional engagement mechanism, a third fluid passage in communication with the high range frictional engagement mechanism, a throttle valve connected to the pressure source for producing throttle pressure in accordance with depression of an accelerator pedal, a governor valve connected to the pressure source and driven by the output shaft for producing governor pressure in accordance with rotational speed of the output shaft, and a shift valve responsive to the governor pressure and the throttle pressure for respectively connecting the second and third fluid passages to the first fluid passage and said reservoir when the governor pressure is lower than the throttle pressure and for respectively connecting the second and third fluid passages to the reservoir and the first passage when the governor pressure increases higher than the throttle pressure, and wherein the improvement comprises a flow regulator valve disposed within the second passage and responsive to the governor pressure to control the flow of fluid from the pressure source to the low range frictional engagement mechanism in accordance with the governor pressure.

BRIEF DESCRIPTION OF THE DRAWINGS

Other objects and features of the present invention will be more clear in the following description of a preferred embodiment, especially when read together with accompanying drawings, in which.

DESCRIPTION OF THE PREFERRED EMBODIMENT

Figure 1:
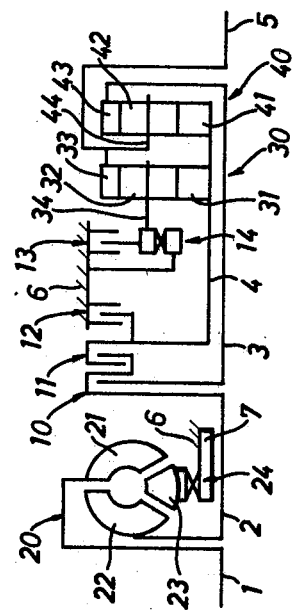
FIG. 1 is a schematic view of an automatic transmission for a vehicle.

Referring now to the drawings, in particular to FIG. 1, a conventional automatic transmission may be seen to comprise a drive shaft 1, an input shaft 2, intermediate shafts 3, 4, and an output shaft 5. The drive shaft 1 may be the usual crankshaft of a vehicle engine, and the output shaft 5 may be connected by any suitable means with the driving road wheels of the vehicle. The input shaft 2 and the intermediate shafts 3, 4 are in effect piloted with respect to shafts 1, 5. The transmission comprises in general a hydraulic torque converter 20, hydraulically operated friction clutches 10, 11, hydraulically operated friction brakes 12, 13, one-way clutches 14, 24, and planetary gear sets 30, 40.

The hydraulic torque converter 20 includes a pump impeller 21, a turbine runner 22 and a vaned stator 23. The pump impeller 21 is driven by drive shaft 1, and the turbine runner 22 is connected to input shaft 2. The stator 23 is rotatably mounded on a stationary sleeve 7, which is fixed to transmission housing 6, and the one-way clutch 24 is disposed between the stator 23 and stationary sleeve 7. The one-way clutch 24 is so arranged as to allow free rotation of stator 23 in the forward direction, that is in the same direction in which the drive shaft 1 rotates and prevents rotation of stator 23 in the reverse direction.

The first friction clutch 10 is arranged to connect the input shaft 2 with the intermediate shaft 3, and the second friction clutch 11 is arranged to connect the input shaft 2 with the intermediate shaft 4 rotatable on the shaft 3. The first planetary gear set 30 comprises a first sun gear 31 fixed to intermediate shaft 4, a planet gear 32 in mesh with sun gear 31, and a ring gear 33 in mesh with planet gear 32. The planet gear 32 is journalled on a carrier 34 which is rotatably disposed within transmission housing 6 through the one-way clutch 14. The carrier 34 is provided thereon with the second friction brake 13, and the ring gear 33 is connected to output shaft 5. The one-way clutch 14 is so arranged as to allow free rotation of carrier 34 in the forward direction, that is in the same direction in which the drive shaft 1 rotates and prevents rotation of carrier 34 in the reverse direction.

The second planetary gear set 40 comprises a second sun gear 41 fixed to intermediate shaft 4, a second planet gear 42 in mesh with sun gear 41, and a ring gear 43 in mesh with planet gear 42. The ring gear 43 is connected to intermediate shaft 3, and the planet gear 42 is journalled on a carrier 44 which is connected to output shaft 5. The intermediate shaft 4 is provided thereon with the first friction brake 12.

For understanding respective drive power trains under each shifted position of the transmission, the relative engagement and disengagement of the friction clutches, the friction brakes and the one-way clutch may be summarized in the following chart. In the chart, the symbol of "0" means engagement of the indicated friction brakes and clutches, the symbol of "X" means engagement of the indicated friction brakes during engine braking operation of the vehicle, and the symbol of "#" means engagement of the one-way clutch during travel of the vehicle.

|  | Clutches | | Brakes | | One-way Clutch |
|---|---|---|---|---|---|
|  | (10) | (11) | (12) | (13) | (14) |
| First | 0 |  |  | X | # |
| Second | 0 |  | 0 |  |  |
| Third | 0 | 0 |  |  |  |
| Reverse |  | 0 |  | 0 |  |

Figure 2:
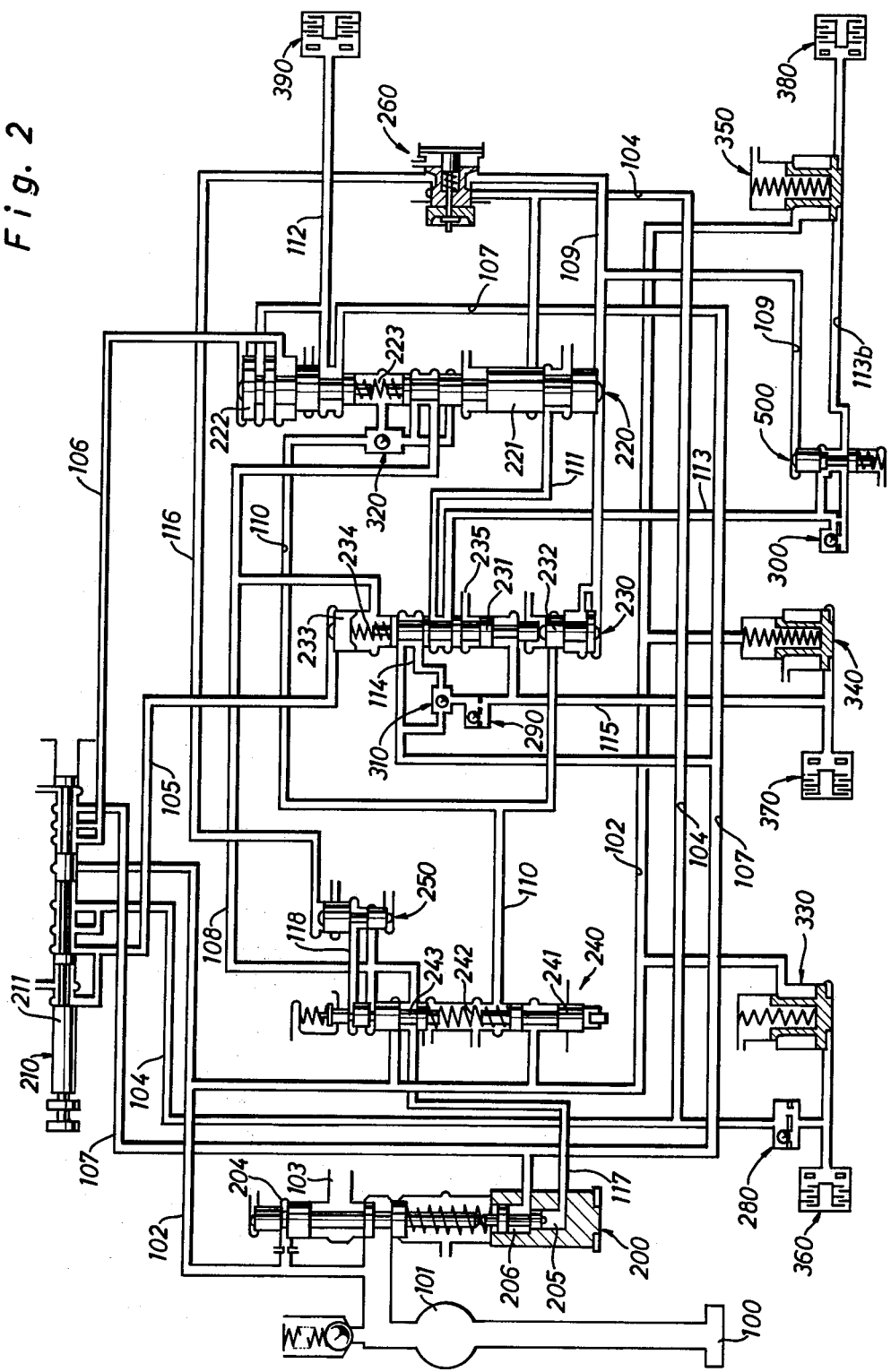
FIG. 2 illustrates an hydraulic control system for the transmission to which the present invention is adapted.

In FIG. 2, there is illustrated an hydraulic control system for the transmission which comprises a fluid pump 101, a pressure regulator valve 200 and a manual selector valve 210. The fluid pump 101 is connected to a fluid reservoir 100 and driven by drive shaft 1 to produce line pressure in a fluid passage 102 as a source of hydraulic pressure. The pressure regulator valve 200 is provided therein with an upper chamber 204 formed by an upper spool and lower chambers 205, 206 formed by a lower spool. In operation of the regulator valve 200, the upper spool is moved in accordance with variation of pressure in chambers 204, 205, 206 to control flow of fluid from the pump 101 to a passage 103 such that the line pressure in passage 102 is regulated in a predetermined value.

The manual selector valve 210 includes a spool 211 which is displaced by a manual shift lever (not shown) provided in the vehicle cab for desired operation of the operator. With the selector valve 210, the line pressure in passage 102 is applied into fluid passages 104 to 107 by displacements of spool 211, as showing in the following second chart.

| Selected Position | Passage (104) | Passage (105) | Passage (106) | Passage (107) |
|---|---|---|---|---|
| Reverse | — | — | 0 | 0 |
| Neutral | — | — | — | — |
| D-range | 0 | — | — | — |
| 2nd-range | 0 | 0 | — | — |
| Low-range | 0 | 0 | 0 | — |

In the second chart, the symbol of "—" means interruption of the indicated passage, and the symbol of "O" means communication of the indicated passage with the line pressure. The selected positions respectively indicate the positions of the mannual selector valve 210 to condition the transmission for the selected drive range.

In the hydraulic control system, servomotors 360, 370 are provided to engage the friction clutches 10, 11 respectively, and servomotors 380, 390 are provided to engage the friction brakes 12, 13 respectively. The line pressure applied to servomotor 360 is controlled by an orifice in a check valve 280 and an accumulator 330, and also the line pressure applied to servomotor 370 is controlled by an orifice in a check valve 290 and an accumulator 340. Furthermore, the line pressure applied to servomotor 380 is controlled by an orifice in a check valve 300, a flow regulator valve 500 and an accumulator 350. In this embodiment, it should be recognized that provision of the regulator valve 500 is the subject matter to complete the present invention. The construction and operation of the regulator valve 500 will be described later in detail to clearly point out the subject matter of the present invention.

The hydraulic control system further includes a throttle valve 240 for producing a throttle pressure in response to depression of an accelerator pedal of the vehicle, and a governor valve 260 for producing a governor pressure in response to rotational speed of output shaft 5. The throttle valve 240 includes a down-shift plug 241 movable within a stepped bore to be moved by the accelerator pedal, and further includes a spool 243 movable within the bore to control the flow of fluid from passage 102 to a passage 108. The down-shift plug 241 is interconnected with spool 243 through a spring 242 to control the flow of fluid from passage 102 to a passage 110. Thus, the throttle pressure from throttle valve 240 is applied through passage 108 to a 1-2 shift valve 220 and a 2-3 shift valve 230, and is also applied through a passage 117 to regulator valve 200.

The governor valve 260 is provided on the output shaft 5 to control the line pressure from passage 104 in accordance with increase of the rotational speed of output shaft 5, thereby producing a governor pressure. The governor pressure is applied through a passage 109 to the 1-2 and 2-3 shift valves 220, 230, and is also applied through a passage 116 to a cut-off valve 250. The cut-off valve 250 serves to control the flow of fluid from passage 108 to passage 118 in accordance with variation of the throttle and governor pressure from throttle and governor valves 240, 260. Thus, the throttle pressure is decreased by the cut-off valve 250 to prevent unnecessary power loss of fluid pump 101.

The 1-2 shift valve 220 includes a pair of spools 221, 222 movable within a stepped bore and a spring 223 interposed between the spools 221, 222. The spool 221 is moved upwardly in accordance with increase of the governor pressure in passage 109 to connect the passage 104 to a passage 111 for 2-3 shift valve 230. When the governor pressure decreases, the spool 221 is moved downwardly by the throttle pressure from passage 108 to connect the passage 111 to a drain port. The spool 221 is also moved downwardly by the line pressure from passage 110 to connect the passage 111 to the drain port. The spool 222 is moved downwardly by the line pressure from the passage 106 to connect the passage 106 to a passage 112 for the servomotor 390.

The 2-3 shift valve 230 comprises spools 231, 232, 233 movable within a stepped bore and a spring 234 interposed between the spools 231, 233. The spools 231, 232 are moved upwardly in accordance with increase of the governor pressure from passage 109 to connect the passage 111 to a passage 114 for the servomotor 370 and to connect a passage 113 for the servomotor 380 to a drain passage 235. When the governor pressure decreases, the spools 231, 232 are moved downwardly by the throttle pressure from passage 108 such that the passage 111 is disconnected from the passage 114 and connected to the passage 113. When the spool 233 is moved down by the line pressure from passage 105, the spools 231, 232 are also moved downwardly by the spring 234 to connect the passage 111 to the passage 113. When the spool 232 is moved down by the line pressure from the passage 110, the spool 231 is moved downwardly by the spring 234 to connect the passage 111 to the passage 113.

Figure 3:
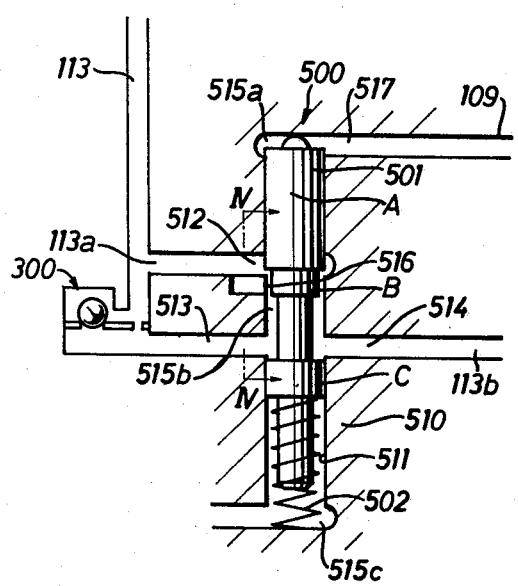
FIG. 3 is an enlarged sectional view of a flow regulator valve in accordance with the present invention.
Figure 4:
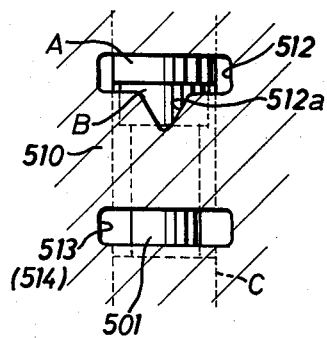
FIG. 4 is a partial cross-sectional view taken along line IV—IV of FIG. 3.

FIG. 3 illustrates an embodiment of the flow regulator valve 500 which comprises a spool 501 movable within a bore 511 of a valve housing 510 and a compression spring 502 biasing the spool 501 upwardly. The valve housing 510 has first and second inlet ports 512, 513, an outlet port 514 and a pilot port 517. The first inlet port 512 is connected through a bypass passage 113a to the passage 113, the second inlet port 513 is connected through the check valve 300 to the passage 113, the outlet port 514 is connected to a passage 113b for the servomotor 380, and the pilot port 517 is connected to the governor valve 260 through the passage 109. The valve housing 510 is also provided with a recess 512a of a V-shaped cross-section at the bottom wall portion of the first inlet port 512, as shown in FIGS. 3, 4. The recess 512a opens at its upper edge into the first inlet port 512 and also opens at its inner vertical edge into the bore 511.

Figure 5:
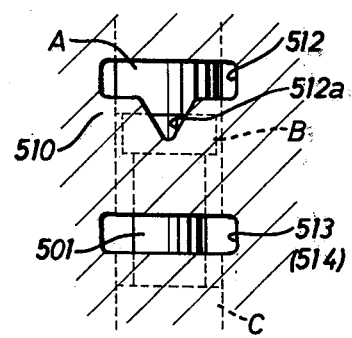
FIG. 5 illustrates the mode of operation of the flow regulator valve in FIG. 4.

The spool 501 is provided thereon with a pair of lands A, C which subdivides the interior of the bore 511 into three chambers 515a to 515c. The upper chamber 515a is in communication with the passage 109 through the pilot port 517, and the lower chamber 515c is in communication with a drain passage. The intermediate chamber 515b opens toward the interior of recess 512a to lead therein flow of fluid from the bypass passage 113a. The intermediate chamber 515b is also in communication with the passage 113 through the second inlet port 513 and is in communication with the passage 113b through the outlet port 514. The upper land A of spool 501 has a stepped portion B which is cooperable with the V-shaped peripheral wall of recess 512a to provide a variable orifice 516 within the chamber 515b. While the spool 501 is maintained in the upper stroke end due to biasing force of the spring 502, the orifice 516 provides a maximum opening area to permit a maximum amount of fluid flowing from the passage 113a of the passage 113b, as shown in FIG. 4. When the spool 501 is moved downwardly in accordance with increase of the governor pressure from passage 109 against biasing force of the spring 502, the opening area of orifice 516 is decreased to steplessly throttle flow of fluid from the passage 113a to the passage 113b, as shown in FIG. 5.

In operation, when the engine is rotated in the neutral position of the manual selector valve 210 to drive the fluid pump 101 and torque converter 20, fluid from the pump 101 is partly applied by the pressure regulator valve 200 to the passage 102 as the line pressure, and the remaining fluid is applied by the regulator valve 200 to the torque converter 20 and other lubricated portions through the passage 103. The line pressure from passage 102 is applied to the accumulators 330 to 350 and the throttle valve 240 but is not applied to the passages 104 to 107 to condition the servomotors 360 to 390 inoperative. Thus, the output shaft 5 may not be rotated regardless of rotation of the input shaft 2.

When the manual selector valve 210 is shifted to its Drive range position, the line pressure from passage 102 is applied to the passage 104 and then applied to the servomotor 360 and governor valve 260. In this instance, the line pressure to servomotor 360 is controlled by the orifice in the check valve 280 and the accumulator 330 to conduct smooth engagement of the friction clutch 10. Thus, the transmission is conditioned for the first speed ratio power train. When the accelerator pedal is depressed to increase rotational speed of the engine, the vehicle travels at the first speed ratio power train in the forward direction. The spool 243 of throttle valve 240 is also moved in response to depression of the accelerator pedal to produce the throttle pressure in passage 108, and the governor valve 260 is operated in response to the forward travel of the vehicle to produce the governor pressure in passages 109, 116.

When the governor pressure is increased in accordance with increase of the vehicle speed, the spool 221 of 1-2 shift valve 220 is moved upwardly against the throttle pressure from the passage 108 and biasing force of the spring 223 to connect the passage 104 with the passage 111. Then, the line pressure is applied through the 2-3 shift valve 230 and the flow regulator valve 500 to the servomotor 380. In this instance, the line pressure to servomotor 380 is controlled by the orifice in check valve 300 and the accumulator 350 to conduct smooth engagement of the friction brake 12. Thus, the transmission is conditioned for the second speed ratio power train.

When the governor pressure is further increased, the spools 231, 232 are moved upwardly against the throttle pressure from the passage 108 and biasing force of the spring 234 to connect the passage 111 with the passage 114 and to connect the passage 113 with the drain passage 235. Then, the line pressure from servomotor 380 is released through the passages 113, 235 to disengage the brake 12. At the same time, the line pressure from passage 111 is applied to the servomotor 370 through the passage 114, the check valve 310 and the passage 115. In this instance, the line pressure to servomotor 370 is controlled by the orifice in check valve 290 and the accumulator 340 to conduct smooth engagement of the friction clutch 11. Thus, the transmission completes the third speed ratio power train.

When the accelerator pedal is deeply depressed to shift down from the third speed ratio power train to the second speed ratio power train, the down-shift plug 241 of throttle valve 240 is moved upwardly to apply the line pressure from the passage 102 to the 2-3 shift valve 230 through the passage 110. At the same time, the throttle pressure of a high value is produced by the throttle valve 240 in response to deep depression of the accelerator pedal and is applied to the 2-3 shift valve 230 through the passage 108. This moves downwardly the spools 231, 232 of 2-3 shift valve 230 against the governor pressure from passage 109. Then, the passage 114 is disconnected from the passage 111 and is connected to the reservoir 100 through the passage 107 and the manual selector valve 210, whereas the passage 111 is connected to the passage 113. Thus, the line pressure from servomotor 370 is released through the check valves 290, 310 to disengage the friction clutch 11, whereas the line pressure from passage 111 is applied to the servomotor 380 to engage the friction brake 12.

In the shift-down operation of the transmission described above, the rotational speed of the engine and the governor pressure from governor valve 260 increase in accordance with increase of travel speed of the vehicle respectively, and centrifugal force acting on fluid within the servomotor 370 also increases in accordance with increase of travel speed of the vehicle. Then, a rate of fluid releasing from the servomotor 370 is decreased due to the centrifugal force to delay completion of disengagement of the friction clutch 11. Meanwhile, the spool 501 of flow regulator valve 500 is moved downwardly due to the governor pressure against biasing force of the spring 502 to move the stepped portion B of upper land A toward the V-shaped peripheral wall of recess 512a. This throttles steplessly fluid flowing from the passage 113a to the servomotor 380 through the passage 113b to delay completion of engagement of the friction brake 12.

In summary, it will be recognized that even if the vehicle runs at any travel speed, the friction brake 12 is gradually engaged by operation of flow regulator valve 500 in relation to disengagement of the friction clutch 11 to smoothly conduct the shift-down operation of the transmission so as to prevent undesired shocks and various noises.

Although in the embodiment the variable orifice 516 of flow regulator valve 500 includes the recess 512a of the V-shaped cross-section cooperable with the stepped portion B of the upper land A, it should be noted that various modifications may be made without departing from the spirit of the present invention and the scope of the appended claims.

What is claimed is:

1. In a hydraulic control system for an automatic transmission having an input shaft adapted to be driven by an engine, an output shaft adapted to drive the vehicle, a change-speed gearing including low and high range frictional engagement mechanisms for respectively completing low and high speed ratio power trains between said input and output shafts, said hydraulic control system comprising a fluid reservoir, a source of line pressure, a first fluid passage in communication with said pressure source, a second fluid passage in communication with said low range frictional engagement mechanism, a third fluid passage in communication with said high range frictional engagement mechanism, a throttle valve connected to said pressure source for producing throttle pressure in accordance with depression of an accelerator pedal, a governor valve connected to said pressure source and driven by said output shaft for producing governor pressure in accordance with rotational speed of said output shaft, and a shift valve responsive to the governor pressure and the throttle pressure for respectively connecting said second and third fluid passages to said first fluid passage and said reservoir when the governor pressure is lower than the throttle pressure and for respectively connecting said second and third fluid passages to said reservoir and said first fluid passage when the governor pressure increases higher than the throttle pressure, the improvement comprising a flow regulator valve disposed within said second fluid passage and responsive to the governor pressure via a fourth fluid passage connected between said governor valve and said regulator valve to control the flow of fluid from said pressure source to said low range frictional engagement mechanism in accordance with the governor pressure.

2. A hydraulic control system as claimed in claim 1, wherein said flow regulator valve comprises:

a housing provided with an inlet port connected to an inlet section of said second fluid passage and an outlet port connected to said low range frictional engagement mechanism through an outlet section of said second fluid passage;

a spring-loaded spool slidably disposed within said housing and having first and second lands, said first land forming a first chamber connected to said governor valve through said fourth fluid passage and associated with said second land to form a second chamber disposed within said second fluid passage, and said second land forming a third chamber connected to said reservoir, and wherein said inlet port is formed with a recess opening toward said second chamber and cooperable at its peripheral wall with said first land to provide a variable orifice, said orifice controlling the flow of fluid between said inlet and outlet ports in response to movement of said spool caused by the governor pressure from said governor valve.

3. An hydraulic control system as claimed in claim 1, wherein said orifice is formed by the peripheral wall of said recess and a stepped portion extending from said first land into said second chamber.

4. An hydraulic control system as claimed in claim 3, wherein the peripheral wall of said recess has a V-shaped cross-section.

* * * * *